United States Patent Office 2,960,445
Patented Nov. 15, 1960

2,960,445
PROCESS OF SEPARATION OF YEASTS FROM LIQUID MEDIA BY AGGLUTINATION OF CELLS OF OPPOSITE MATING TYPES

Lynferd J. Wickerham, Peoria, Ill., assignor to the United States of America as represented by the Secretary of Agriculture No Drawing. Filed July 30, 1959, Ser. No. 830,683

1 Claim. (Cl. 195—74)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the removal of yeast from fermentation or propagation liquid medias by flocculation resulting from the sexual phenomenon in which cells of the opposite sexes strongly clump together. In most yeasts possessing this phenomenon the reaction occurs immediately upon contact of cells of the opposite sexes, in others it occurs after rather definite periods in which the two sexes have been growing together in the same culture. The clump of cells, even in small volumes in test tubes, may reach dimensions of a centimeter or more. The clumps settle rapidly to the bottom of the container, in marked contrast to the cultures of ordinary food and feed, bakery, brewery, wine, and distillers yeasts, in which the cells remain dispersed in liquid, and would require days to settle in large tanks. In the production of food, feed, and baker's yeasts centrifuges are required to separate the yeast from the worts in which they were grown. In wine production a series of rackings (settling followed by decanting) is involved, with consequent danger of infection and damage to flavor. In various brewing processes autoagglutination of the brewery yeast is depended upon for clarification of the beer, but commonly the brewery yeast becomes nonagglutinating and the yeast must then be replaced in a yeast which agglutinates at the correct time in the brewing procedure. The use of mutuall agglutinating mating types should give precise control of this step in the process. In some distilleries, the yeasts and other solids are removed mechanically before the fermented mash goes to the stills.

The invention concerns the flocculation mechanism which causes separation of yeast from aerated propagation worts or mashes where the primary product is yeast, such as food or feed yeast, and baker's yeast. It also would apply to anaerobic fermentations, such as brewing, distillation, and wine production, where the yeast must be removed to yield two acceptable products, the yeast which serves as a rich concentrate for livestock feeds, and the clear, fermented liquids. In all these industries, it is possible that the use of mutually-agglutinative yeasts may reduce the cost of separating yeasts from the liquid in grown separatey and then mixed in a common tank and which they were grown. The opposite sexes would be grown separately and then mixed in a common tank and allowed to settle, after which the supernatant could be run off and a small percentage of the liquid containing the yeast would be centrifuged, or all of the liquid would be drained off and the yeast shovelled off the floor of the settling tank.

Yeasts in which the mutual agglutination process has been discovered are the following:

*Citeromyces matritensis* Santa María 1956, NRRL Y–2407
*Endomycopsis rettgeri*, sp. nov, NRRL Y–2408
*Saccharomyces kluyveri* Phaff, Miller, and Shifrine 1956, NRRL Y–4288
*Saccharomyces besseyi*, sp. nov, NRRL Y–2424

Naturally occurring hybrids intermediate between *S. kluyveri* and *S. besseyi*.

The occurrence of yeasts which possess mutual agglutination in four genera of yeasts indicates the wide taxonomic area which the invention covers.

Species differ in some aspects of the mutual agglutination reaction. Some strains mutually agglutinate immediately on mixing the opposite sexes, and others do not agglutinate under any known conditions. When an agglutinative strain is hybridized with a nonagglutinative strain, most of the ascosporic offspring of the hybrid agglutinate immediately upon mixing, some require a period of time, generally a few minutes, before agglutination occurs, and a very few are nonagglutinative. *Endomycopsis rettgeri* NRRL Y–2408 requires many hours or several days before mixing before agglutination occurs on agar media, and it does not occur in liquid media at all. Agar-grown cells of *Citeromyces matritensis* NRRL Y–2407 agglutinates without the dramatic binding of water which occurs when agar-grown cells of all of the other mutually-agglutinating species (except *E. rettgeri*) are mixed, but when liquid cultures are mixed, the reaction is strongest in *C. matritensis*.

In the Saccharomyces species, mating types having more than one set of chromosomes are commonly produced, and generally the greater the number of sets, the larger are the cells, the stronger is the mutual agglutination reaction, the faster is the rate of growth, and the stronger is the biochemical reactions of the mating type. Thus it is clear that industrial processes involving mutual agglutination will vary depending upon the characteristics shown by the particular strain, hybrid, or species used, and the number of sets of chromosomes (the degree of ploidy) possessed by the mating types. Mating types of all of the species except Saccharomyces normally contain one set of chromosomes, but the number probably could be increased by treatment with camphor or acenapthene, as these chemicals have commonly been used for increasing the ploidy of yeasts. Since *Saccharomyces kluyveri* NRRL Y–4288, *S. besseyi* NRRL Y–2424 and the intermediate hybrids normally produce mating types having more than one set of chromosomes, they are immediately adequate for some industrial processes, such as production of food and feed yeast from molasses or other substrates, and possibly for production of fermented liquid. *S. besseyi* is more versatile industrially than *S. kluyveri*, since the former ferments maltose.

Because various types of agglutination commonly occur in yeasts, I will indicate precisely what was found as a new phenomenon. It is generally true that haploid cells stemming from a single ascospore of a heterothallic yeast tend to agglutinate in small but rather dense clumps of cells. The cells may or may not be connected somatically. In either case, such colonies tend to sink in liquid medium at a more rapid rate than cells of the less frequent haploids which grow as single cells or pairs. Diploids, to the contrary, usually grow as single cells or pairs.

Haploids of many species have a much greater tendency to grow as cell colonies in liquid media than on solid media. As used in these experiments, the haploid cells of *C. matritensis* NRRL Y–2407 in liquid media occur in relatively large agglutinated cell colonies. This fact is of interest because the large cell colonies of *C. matritensis* undoubtedly accentuate the type of agglutination which is new and noteworthy: the agglutination that occurs when liquid cultures of opposite sex are mixed.

Each of the two species is discussed separately, and diagnosis is presented for the new species.

The cultures used are *C. materitensis* NRRL Y–2407, mating types 9 and 10; *Torulopsis globosa* NRRL Y–1506; *Endomycopsis rettgeri* NRRL Y–2408, mating types 5 and 12, *Saccharomyces kluyveri* NRRL Y–4288 mating types 7 and 13, and *Saccharomyces besseyi* NRRL Y–2424 mating types 1 and 3.

Yeast extract-malt extract (YM) broth is commonly used for agglutination tests with *C. matritensis* NRRL Y–2407, while the corresponding agar medium was used for *E. rettgeri* NRRL Y–2408. The YM medium consists of 3 grams each of yeast extract and malt extract, 5 grams of peptone, and 10 grams of glucose per liter of distilled water. The pH is not adjusted. Twenty grams of agar are used per liter to prepare a solid medium. Liquid cultures may be incubated at 25° C. or 28° C. for 1 to 3 days, still or on reciprocal or rotary shakers.

*Citeromyces matritensis* Santa María 1956, NRRL Y–2407, is a heterothallic species that exist in nature as the haploid, known as *Torulopsis globosa* (Olson et Hammer), Lodder et Kreger-van Rij, and as the diploid, evidently described for the first time by Santa María. Mating types are readily derived by heat treatment of the sporulated diploid culture at 55° C. The vegetative cells are killed first, and plates streaked after 10 minutes of heating yield colonies consisting of one or the other sex. The ascosporic cultures are creamy in consistency, but when slant-grown cells of opposite sex are mixed on a solid medium, a very slight stiffening of the cell mass may occur, and the cells, when placed in water, are seen to be agglutinated. A most vigorous reaction is produced, however, when liquid cultures of the separate sexes, whether grown in still or shaken culture, are poured together and shaken for 10 to 20 seconds. The cells agglutinate in large masses that settle to the bottom of the container. When both sexes are grown together in liquid medium, particularly in still cultures, the cells are agglutinated. Cells of opposite mating types grown separately are not.

Agglutinated cells of opposite sexes deagglutinate in liquid when heated. On cooling, they reagglutinate. Three cycles of deagglutination and reagglutination were effected with the same cells, and they were still active when the alternate heating and cooling was discontinued. Cells grown in various liquid media deagglutinate at different temperatures. Thus, deagglutination is at a lower temperature in glucose-yeast nitrogen base medium than in nitrate-yeast carbon base medium; it occurs at a considerably higher temperature in YM broth. The floccules start to break up at about 48° C. in the former two media, but not in YM medium. The cells are completely deagglutinated in the glucose-yeast nitrogen base medium at 52° C., in the nitrate-carbon base medium at 55° C., and in YM broth at 58° C. Upon cooling, reagglutination commences in all three media at about 44° C. and floccules continue to increase in size as the temperature drops below that point.

Cell colonies of single sexes do not deagglutinate when liquid cultures are heated.

Equal amounts of liquid culture are not necessary to obtain strong agglutination. How high the ratio may be is dependent upon which mating type is used to supply the larger volume. Thus, using shaker cultures of *Citeromyces matritensis* NRRL Y–2407 incubated at 48 hours at 28° C., 10 volumes of mating type 9 to 1 volume of mating type 10 of said yeast species gives immediate and strong agglutination, but 10 volumes of mating type 10 to 1 of mating type 9 gives a much slower reaction. It is of interest to note that the cell colonies of *Citeromyces matritensis*, mating type 9 are large, often numbering 50 cells or more, while those of mating type 10 are smaller, seldom exceeding 10 cells per colony. It may be that in mixtures containing many large clusters (i.e., 10 volumes of mating type 9 to 1 of mating type 10), the small clusters link the large ones together and immediate flocculation of the huge complexes occurs. When the reverse is true (i.e., 10 volumes of 10 to 1 of 9), many small clusters may coat the relatively few large clusters completely. Thus the resulting complexes have no attraction for each other, though they are sufficiently large to settle out. When the supernatant from a liquid culture of either sex is added to an equal volume of liquid culture of the opposite sex, there is no agglutination.

Shaken cultures of *Citeromyces matritensis* NRRL Y–2407 of each sex in YM media containing, respectively, 1 percent glucose and 5, 20, 40, 60, and 80 percent sucrose were grown for 3 days at 28° C. The growth, determined turbidimetrically, was about equal in the first two media, nearly as good in the 20 percent sucrose, and moderate at 40 percent. There was scant growth at 60 and 80 percent. Equal volumes of corresponding cultures were mixed together. Agglutination was strong in the 1 and 5 percent sugar concentrations, moderate in the 20 percent, weak in the 40 percent, and indefinite in the 60 and 80 percent. Sporulation was practically nil on 20 percent sucrose agar slants. These facts indicate that *C. matritensis* NRRL Y–2407 has been isolated only from substrates of high osmotic pressure simply because other microorganisms are completely inhibited by it, and not because *C. matritensis* NRRL Y–2407 has a preference for media of high osmotic pressure.

One strain of the haploid *Torulopsis globosa* agglutinates strongly and forms ascospores with mating type number 10 derived from *C. matritensis* NRRL Y–2407.

*Saccharomyces besseyi*, nov. sp., NRRL Y–2424, exists in nature as a heterothallic yeast. It has 1 to 4 round ascospores per ascus, and asci and ascospores are of the same type as the type species of the genus, *Saccharomyces cerevisiae*. Mating types are mutually agglutinative, and they agglutinate and hybridize with *Saccharomyces kluyveri* NRRL Y–4288. These two species are closely related, the principal taxonomic differences residing in the ability of *S. besseyi* NRRL Y–2424 to produce a gaseous fermentation of maltose, and to grow in synthetic media without any addition of vitamins. *S. kluyveri* NRRL Y–4288 is incapable of either. *S. besseyi* NRRL Y–2424 does not produce hyphae.

*Saccharomyces besseyi* NRRL Y–2424 ferments glucose, galactose, maltose, sucrose, melibiose, and raffinose, but not lactose. Glucose, galactose, maltose, sucrose, cellobiose, trehalose, melibiose, raffinose, melezitose, inulin, mannitol, sorbitol, alphamethylglucoside, calcium 2-ketogluconate, and lactate are assimilated strongly or moderately. Ethyl alcohol, salicin, and pyruvate are assimilated moderately or weakly. L-sorbose, lactose, soluble starch, xylose, L-arabinose, D-arabinose, D-ribose, rhamnose, D-glucosamine, glycerol, erythritol, adonitol, dulcitol, potassium gluconate, potassium 5-ketogluconate, potassium sodium saccharate, succinate, citrate, ethyl acetoacetate, inositol, and nitrate are not assimilated. Vitamins are not required for growth.

Strains intermediate between *S. kluyveri* NRRL Y–4288 and *S. besseyi* NRRL Y–2424 have been found, and their mating types are mutually agglutinative also. Such intermediates require vitamins and they do produce a gaseous fermentation of maltose.

The following examples are illustrative of the invention. It will be apparent to those skilled in the art that the novel procedure can be applied to any fermentation without departing either from the scope or the spirit of the invention.

Example 1

YM slant cultures of *C. matritensis* (NRRL Y–2407), mating types 9 and 10, were each put through 4 daily 25° C. serial transfers and from the last 24-hour YM slant of each an aqueous dispersion having a standard density of 55 percent L.T. (Lumetron, Blue filter) was prepared. One-half ml. of each of the above adjusted innoculums was added to respective flasks containing 100 ml. 3 percent glucose YM broth and the flasks were placed on a Gump shaker maintained at 25° C. for 4 days at which time an 80 ml. aliquot of each dispersion was withdrawn and mixed with the other in a cylinder by 10 successive inversions thereof. The cylinder and its contents were then permitted to stand for 10 minutes, at which time there were 20 ml. of a flocculent precipitate and 140 ml. of slightly hazy supernatant. After separation of the two layers, 10 ml. (1/14) of the supernatant was centrifuged at 5000 r.p.m. for 10 min. to give a packed cell volume of 0.035 ml., which value should be multiplied by the factor of 14 to give 0.49 ml. if the entire supernatant had been centrifuged. Similarly, 10 ml. (one-half) of the flocculent sexual agglutination precipitate was centrifuged, which gave 2.9 ml. of packed cells. Multiplying that value by the factor of two gives a value of 9.8 ml. for the entire flocculent precipitate. Since it is calculated that 9.8 ml. of 10.29 ml. total cells were recoverable, it is apparent that the efficiency in this experiment was 95.2 percent of the total cells, which value would undoubtedly increase somewhat if the settling period were extended.

*Example 2*

Eighty ml. suspension aliquots of *S. kluyveri* opposite mating types (NRRL Y–4288–7D1 and Y–4288–13D1) were obtained and mixed in the manner shown in Example 1 to give 108 ml. of supernatant liquid and 52 ml. of a flocculent precipitate. Centrifuging 10 ml. of the supernatant gave 0.025 ml. of packed cells which would be 2.7 ml. of packed cells in the entire supernatant. Centrifuging a 10 ml. aliquot of the separated flocculent sexually agglutinated cells gave 2.0 ml. of packed cells which would be 10.4 ml. if all were spun. Therefore the direct recovery would be 79.4 percent.

I claim:

A method for separating from their liquid culture media yeast cells of a heterothallic yeast selected from a group consisting of *Citeromyces matritensis* Santa María 1956, NRRL Y–2407, *Saccharomyces kluyveri* Phaff, Miller and Shifrine 1956, NRRL Y–4288, *Saccharomyces besseyi* sp. nov., NRRL Y–2424, by growing the opposite sexes of a said heterothallic yeast separately, mixing the propagated yeast slurries of the opposite mating types together in a common tank, and settling out the mutually agglutinated yeast cells and recovering the yeast.

References Cited in the file of this patent

Wickerham: Compt-rend. Lab. Carlsberg, Ser. Physiol, vol. 26, No. 25 (1956), pages 423–443.